(12) United States Patent
Noonan

(10) Patent No.: US 8,009,313 B2
(45) Date of Patent: Aug. 30, 2011

(54) ONLINE IMAGE CUSTOMIZATION AND PRINTING ON MERCHANDISE

(76) Inventor: Jeremy Noonan, Fair Oaks, CA (US)

( * ) Notice: Subject to any disclaimer, the term of this patent is extended or adjusted under 35 U.S.C. 154(b) by 903 days.

(21) Appl. No.: 12/008,365

(22) Filed: Jan. 10, 2008

(65) Prior Publication Data

US 2009/0180153 A1    Jul. 16, 2009

(51) Int. Cl.
*G06F 15/00* (2006.01)
*G06F 3/12* (2006.01)
*G06K 1/00* (2006.01)

(52) U.S. Cl. ........................... 358/1.15; 358/1.13

(58) Field of Classification Search .............. 358/1.1, 358/1.13, 1.14, 1.15, 1.18; 705/26.5, 27.2
See application file for complete search history.

(56) References Cited

U.S. PATENT DOCUMENTS

| | | | |
|---|---|---|---|
| 6,973,222 B2 | 12/2005 | Haeberli | |
| 7,016,869 B1 | 3/2006 | Haeberli | |
| 7,216,092 B1 | 5/2007 | Weber et al. | |
| 2003/0069809 A1 | 4/2003 | von Rosen et al. | |
| 2004/0250205 A1 | 12/2004 | Conning | |

*Primary Examiner* — Douglas Q Tran
(74) *Attorney, Agent, or Firm* — Ash Tankha; Lipton, Weinberger & Husick

(57) ABSTRACT

Disclosed herein is a computer implemented method and system for customizing an image to be printed on a printable surface of an item selected by a user. The user submits an image on a host website. The user selects at least one of multiple image filters provided on the host website. The user adjusts settings of the selected image filters to be applied on the image. The user may also set transparency of one or more colors of the image. The colors are selected from a palette comprising the colors of the image. The user customizes the image using the adjusted settings of the selected image filters. The host website regenerates the customized image for each of the adjusted settings. The user selects an item on the host website and customizes external attributes of the item. The customized image is then printed on the printable surface of the selected item.

13 Claims, 11 Drawing Sheets

ONLINE IMAGE CUSTOMIZATION AND PRINTING ON MERCHANDISE

BACKGROUND

This invention, in general, relates to electronic commerce. More particularly, this invention relates to customizing an image to be printed on a printable surface of an item selected by a customer.

Product customization is popular in online marketing. Customers may desire to add personalized features to a wide variety of products. A customer may use photo editing software for personalizing text and graphics of a product. Typically, the photo editing software may not be available to everyone. The customer may also desire to customize the graphic image attributes namely the size, shape, or format of a digital image using the photo editing software. The customer may also desire to remove colors from an image in order to set transparency using the photo editing software. However, the photo editing software may be complicated to use and the customization options presented to the customer are often quite limited. Even in an online environment the customers may not have the necessary image filters or tools to customize the graphic image to match the preference of the customers.

The customers may also wish to customize the product onto which the customized image is to be printed. The customers may desire to customize the size, shape, and colors of the products. However, the customer may not have the required options for customizing the product to the customer's preferences. Therefore, the customer may be provided with an unsatisfactory product. Therefore, there is a need for an online image customization tool that is widely available, economical, and enables the users to customize images and print the customized image on products with ease.

SUMMARY OF THE INVENTION

The computer implemented method and system disclosed herein addresses the above stated need for customizing an image to be printed on a printable surface of an item selected by a user.

The user submits an image on a host website. The image may be obtained from multiple sources including a computing device of the user, a host website, and external websites. The host website provides multiple image filters for customizing the image. The user may select at least one of multiple image filters provided on the host website. The user may adjust settings of the selected image filters in order to customize the image. The user may also set transparency of one or more colors of the image. The colors are selected from a palette comprising the colors present in the image. The method disclosed herein therefore enables the user to remove selected colors from the image during customization. The user customizes the image by applying the selected image filters with adjusted settings. The user may also provide a text message with the customized image. The step of customizing the image further includes editing image attributes and text attributes. The user may adjust image attributes including blur amount of the image, size of the image, image resolution, print resolution, location of the image on the printable surface, and number of colors used in the image. The user may edit text attributes such as text size, location of text with respect to the image, and text color.

The host website regenerates the customized image for each of the adjusted settings of the image filters. The user may then select an item provided by the host website in order to print the customized image on the item. The host website enables the user to customize external attributes of the selected item. The external attributes include size, shape, texture, material, color, and quantity of the item. The customized image may be printed on the printable surface of the selected item. The user may place an order for the item printed with the customized image and perform an online monetary transaction for purchasing the item.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
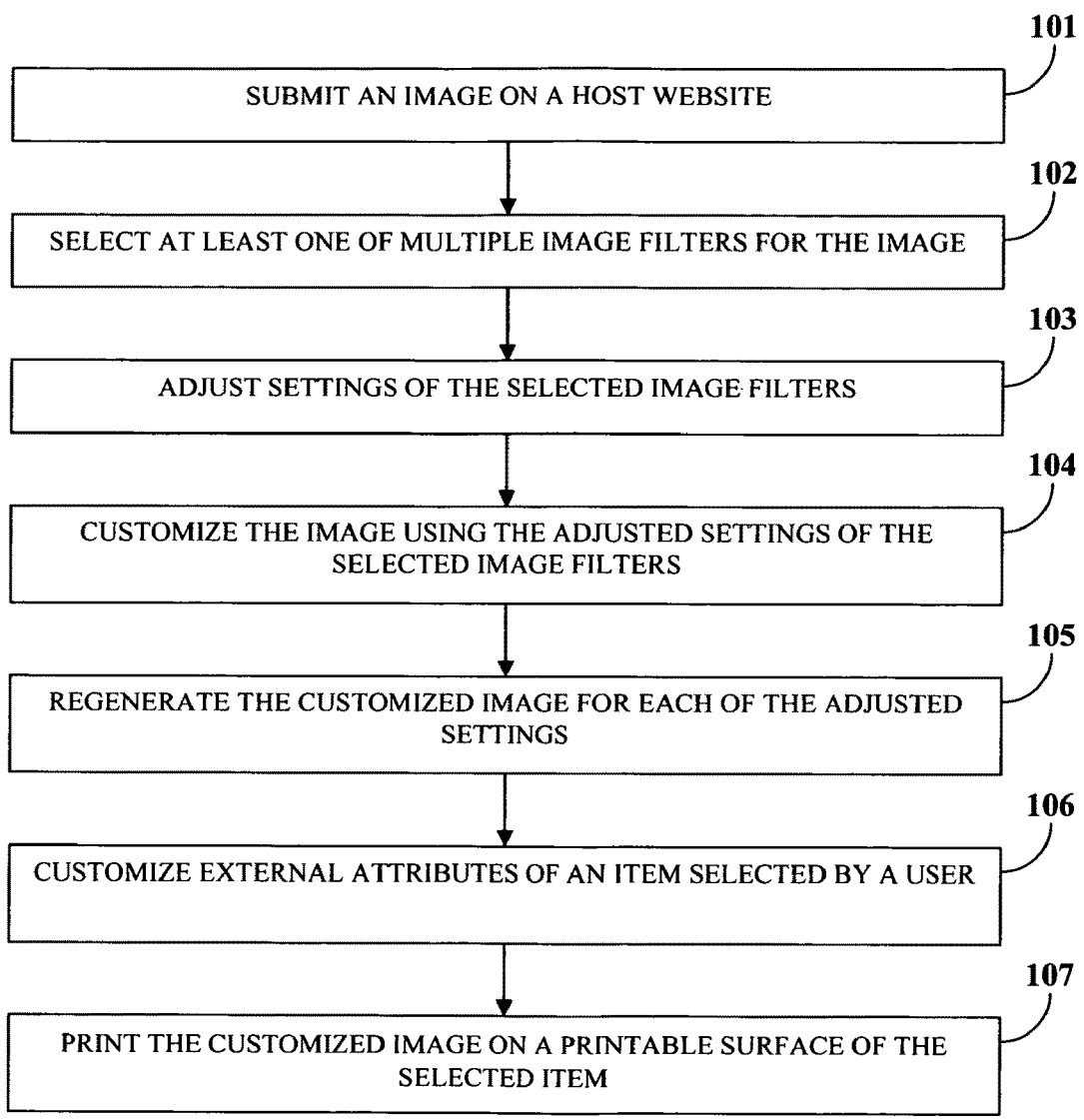
FIG. 1 illustrates a method of customizing an image to be printed on a printable surface of an item selected by a user.

FIG. 1 illustrates a method of customizing an image to be printed on a printable surface of an item selected by a user 201. The user 201 accesses a host website using a web browser on a computing device 202. The computing device 202 may be a personal computer, a laptop, a mobile phone, a personal digital assistant, etc. The user 201 submits 101 an image on the host website. The image may be a digital photograph provided by the customer or another type of graphic image. The image may be obtained from multiple sources such as a computing device 202 of the user 201, a host website, and external websites. For example, the user 201 may upload an image stored on the computing device 202, use a sample photo provided by the host website, or provide a link for downloading the image.

The host website provides multiple image filters for customizing the image. The image filters may include filters for color reduction, recoloring the image, brightening colors of the image, creating grayscale and negative of the image, etc. The host website displays the image submitted by the user 201 in multiple filtered forms on the host website. The image submitted by the user 201 is also displayed alongside the image filter options on the host website. The user 201 may then select 102 at least one of multiple image filters provided on the host website based on the user's 201 preferences.

On selecting the image filters, the image in the selected filtered form is displayed to the user 201. The user 201 may then adjust 103 settings of the selected image filters. The user 201 may adjust image attributes including blur amount of the image, size of the image, image resolution, print resolution, location of the image on the printable surface, and number of colors used in the image. The user 201 may also adjust the hue, saturation, and brightness of the image. The host website also provides the user 201 with a series of checkboxes containing all the colors used in the image. The user 201 may set the transparency of the image by selecting colors from a palette comprising the colors of the image. The selected colors are then made transparent on an item selected by the user 201. The host website therefore enables the user 201 to remove background colors in the image and print the image without the background colors on the item.

The user 201 then customizes 104 the image by applying the selected image filters with adjusted settings. The user 201 may customize the image by cropping the image to a size preferred by the user 201. The user 201 may also be allowed to perform image manipulations such as changing the shape of the image, scaling the image, and changing the format of the image. The user 201 may scale the image by stretching or compressing the image horizontally or vertically. A preview of the cropped or manipulated image is then displayed on the host website.

The user 201 also has an option of adding a caption to the image. The user 201 may enter text to be printed as a caption for the image. The user 201 may also have an option of choosing font and editing text attributes such as text size, location of text with respect to the image, and text color. The resulting image comprising the image and the caption is then displayed on the host website. Each of the resulting images is regenerated 105 and displayed on the host website. The user 201 views the displayed regenerated images on the host website. The regenerated images comprise the adjustments made to the settings of the image filters including the image attributes, the text attributes, the transparency settings, etc. The user 201 may then select one of the regenerated images and add the selected regenerated image to a shopping cart.

The host website provides a variety of merchandise items to the user 201. The user 201 may select an item and customize 106 external attributes of the item. The external attributes include size, shape, texture, material, color, and quantity of the item. The customized image may be printed 107 on a printable surface of the selected item.

The user 201 places an order for the item with the customized image. The user 201 may also place an order for prints of the customized image. Once the user 201 has placed the order, the user 201 is requested to provide a billing address and a shipping address. The user 201 then performs an online monetary transaction for purchasing the item. The user 201 may purchase the item via a credit card payment, check payment, or a demand draft payment. On receipt of the payment, the item with the customized image is shipped to the address provided by the user 201.

Figure 2:
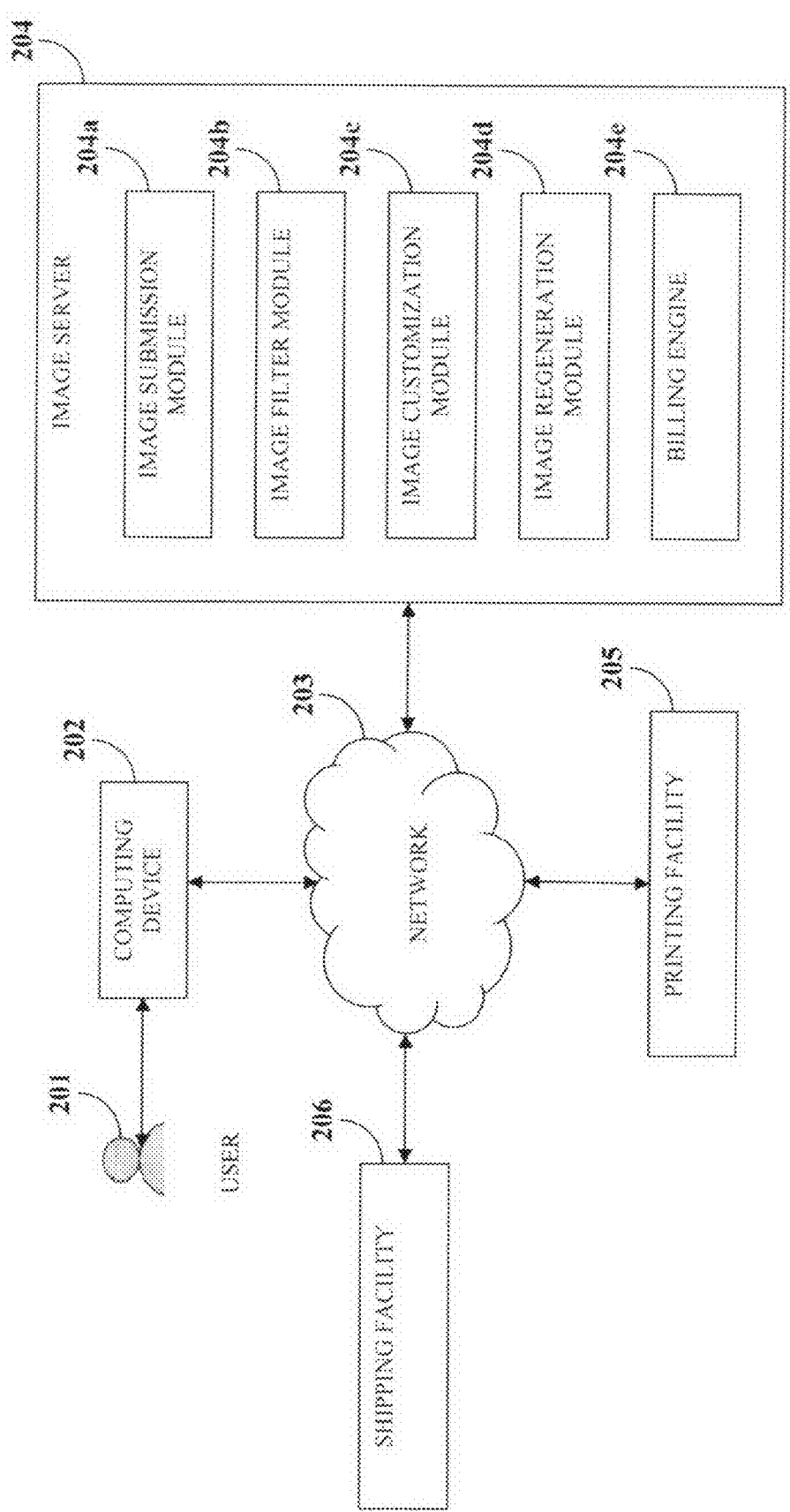
FIG. 2 illustrates a system for customizing an image to be printed on a printable surface of an item selected by a user.

FIG. 2 illustrates a system for customizing an image to be printed on a printable surface of an item selected by a user 201. The system disclosed herein comprises a computing device 202, an image server 204, a printing facility 205, and a shipping facility 206 connected via a network 203. The image server 204 comprises an image submission module 204a, an image filter module 204b, an image customization module 204c, an image regeneration module 204d, and a billing engine 204e.

The user 201 accesses a host website using a web browser on the computing device 202. The computing device 202 may be a personal computer, a laptop, a mobile phone, a personal digital assistant, etc. A user 201 submits an image on the host website. The image may be a digital photograph or a graphic image provided by the customer. The image may be obtained from multiple sources such as a computing device 202 of the user 201, a host website, and external websites. For example, the user 201 may upload an image stored on the computing device 202, use a sample photo provided by the host website, or provide a link for downloading the image.

An image submission module 204a acquires the image submitted by a user 201. The host website provides multiple image filters for customizing the image. The image filters may include filters for color reduction, recoloring the image, brightening colors of the image, creating grayscale and negative of the image, etc. The image filter module 204b filters the image submitted by the user 201 and displays the image in multiple filtered forms on the host website. The user 201 then selects at least one of multiple image filters provided on the host website.

The image filter module 204b further enables the user 201 to adjust 103 settings of the selected image filters. The image filter module 204b enables the user 201 to adjust image attributes including blur amount of the image, image resolution, print resolution, size of the image, location of the image on the printable surface, and number of colors used in the image. The image filter module 204b also enables the user 201 to adjust the hue, saturation, and brightness of the image. The image filter module 204b also provides the user 201 with a series of checkboxes containing all the colors used in the image. The image filter module 204b enables the user 201 to adjust transparency of the image by selecting colors from a palette comprising colors of the image. The selected colors are made transparent on an item selected by the user 201. The image filter module 204b therefore enables the user 201 to remove background colors in the image. The image without the background colors may later be printed on the item using the printing facility 205.

The image customization module 204c enables the user 201 to customize the selected image using one or more of the adjusted settings of the selected image filters. The image customization module 204c enables the user 201 crop the image to a size preferred by the user 201. The image customization module 204c may also enable the perform image manipulations such as changing the shape of the image, scaling the image, and changing the format of the image.

The image customization module 204c further enables the user 201 to add a caption to the image. The user 201 may enter text to be printed as a caption for the image. The user 201 may also have an option of choosing font and editing text attributes such as text size, location of text with respect to the image, and text color. The image customization module 204c therefore customizes the image based on the user's 201 preferences.

The image regeneration module 204d regenerates each of the resulting images and displays the regenerated images on the host website. The regenerated images comprise the adjustments made to the settings of the image filters including the image attributes, the text attributes, the transparency settings, etc. The user 201 selects the regenerated images and adds the regenerated images to a shopping cart.

The user 201 may select an item from a variety of merchandise items provided on the host website. The user 201 customizes external attributes of the item using the image customization module 204c. The image customization module 204c customizes external attributes such as size, shape, texture, material, color, and quantity of the item. The printing facility 205 prints the customized image on a printable surface of the selected item.

The user may then place an order for the item printed with the customized image. The user 201 may also place an order for prints of the customized image. Once the user 201 has placed the order, the user 201 is asked to provide a billing address and a shipping address. The billing engine 204e processes the order. The billing engine 204e manages and controls the online monetary transaction performed by the user 201 during purchase of the item with the customized image. On receipt of the payment, the shipping facility 206 ships the item with the customized image to the address provided by the user 201.

Figure 3A:
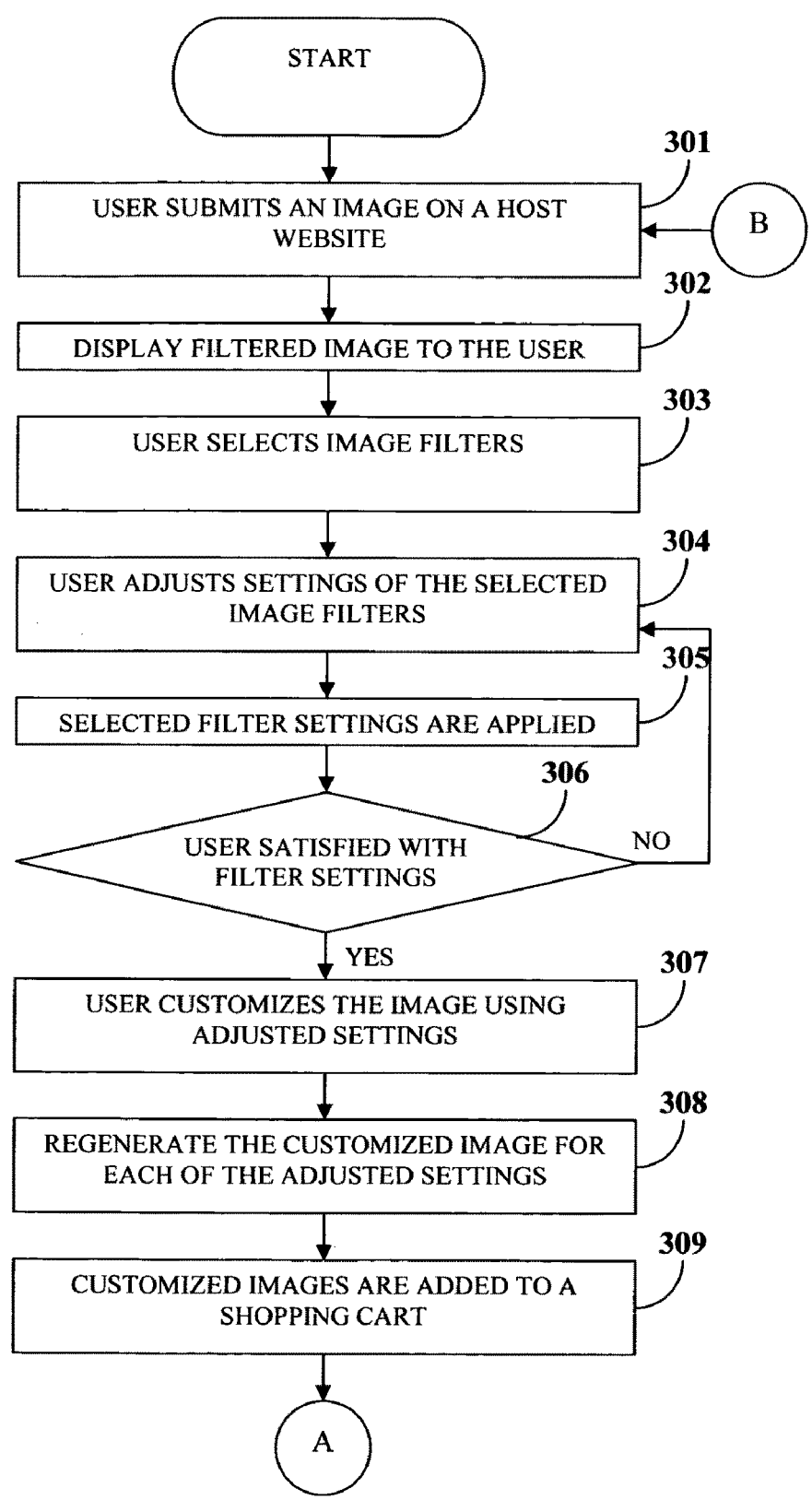
FIGS. 3A-3B illustrate a flowchart describing the steps involved in customizing an image to be printed on a printable surface of an item selected by a user.
Figure 3B:
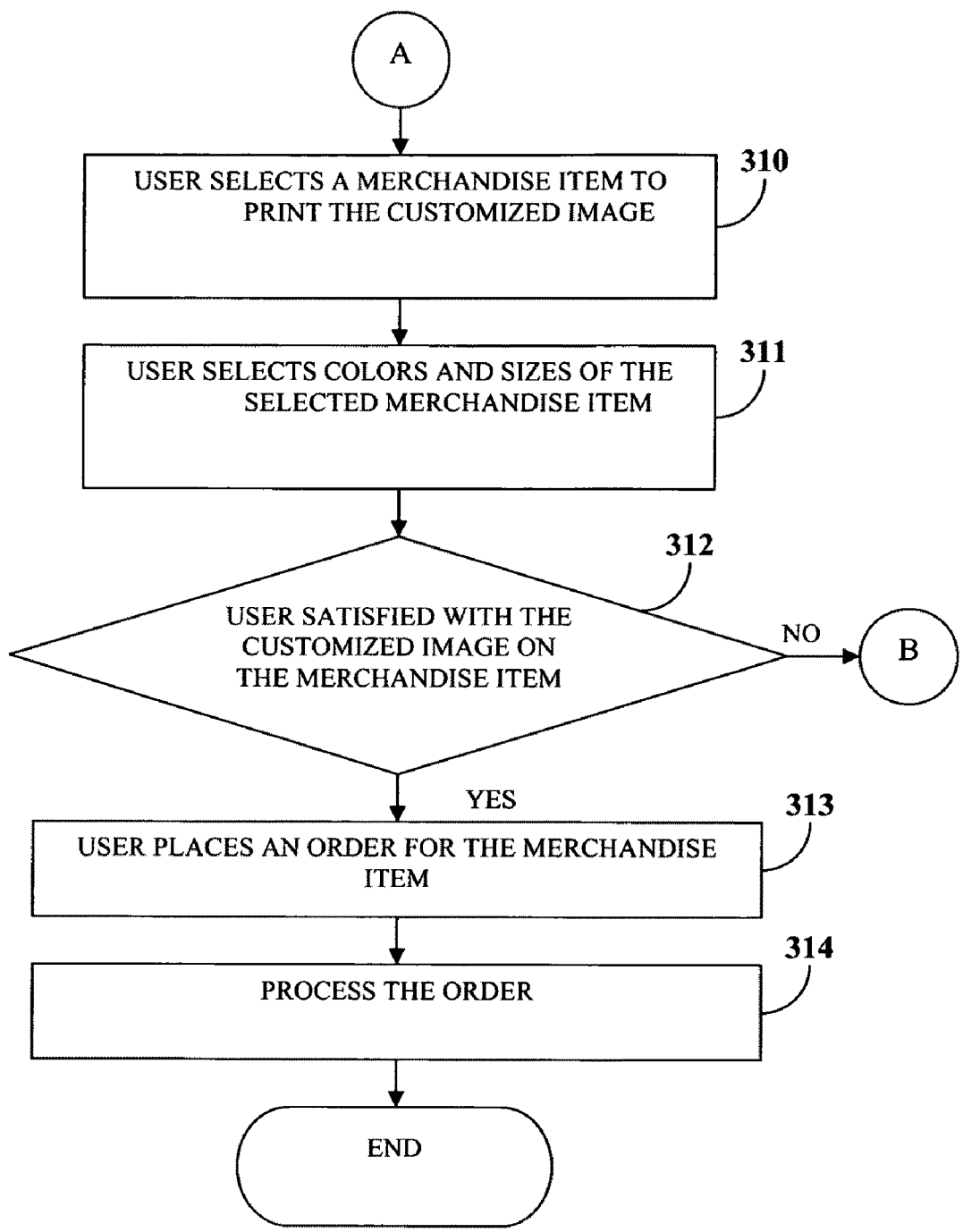

FIGS. 3A-3B illustrate a flowchart describing the steps involved in customizing an image to be printed on a printable surface of an item selected by the user 201. The user 201 submits 301 an image on the host website. The host website displays 302 the image submitted by the user 201 in multiple filtered forms on the host website. The user 201 selects 303 at least one of multiple image filters in order to manipulate the image. The user 201 then adjusts 304 settings of the selected image filters. The selected image filters are then applied 305 to the image. The host website determines 306 whether the user 201 is satisfied with the filter settings. If the user 201 is satisfied 306 with the filter settings, the user 201 customizes 307 the image using the adjusted settings. If the user 201 is not satisfied 306 with the filter settings the user 201 is further adjusts 304 settings of the selected filtered images. The host website then regenerates 308 the customized image for each of the adjusted settings of the image filters and displays each of the regenerated images on the host website.

The user 201 selects and adds 309 the regenerated images to the shopping cart. The user 201 further selects 310 a merchandise item onto which the customized image is to be printed. The user 201 selects 311 colors and sizes of the selected merchandise item. If the user 201 is satisfied 312 with the merchandise item with the customized image, the user 201 places 313 an order for the merchandise item. If the user 201 is not satisfied 312 with the customized image on the printable surface, the user 201 may submit 301 another image on the host website. The order is then processed 314 and the user 201 performs an online monetary transaction for purchasing the merchandise item.

Figure 4A:
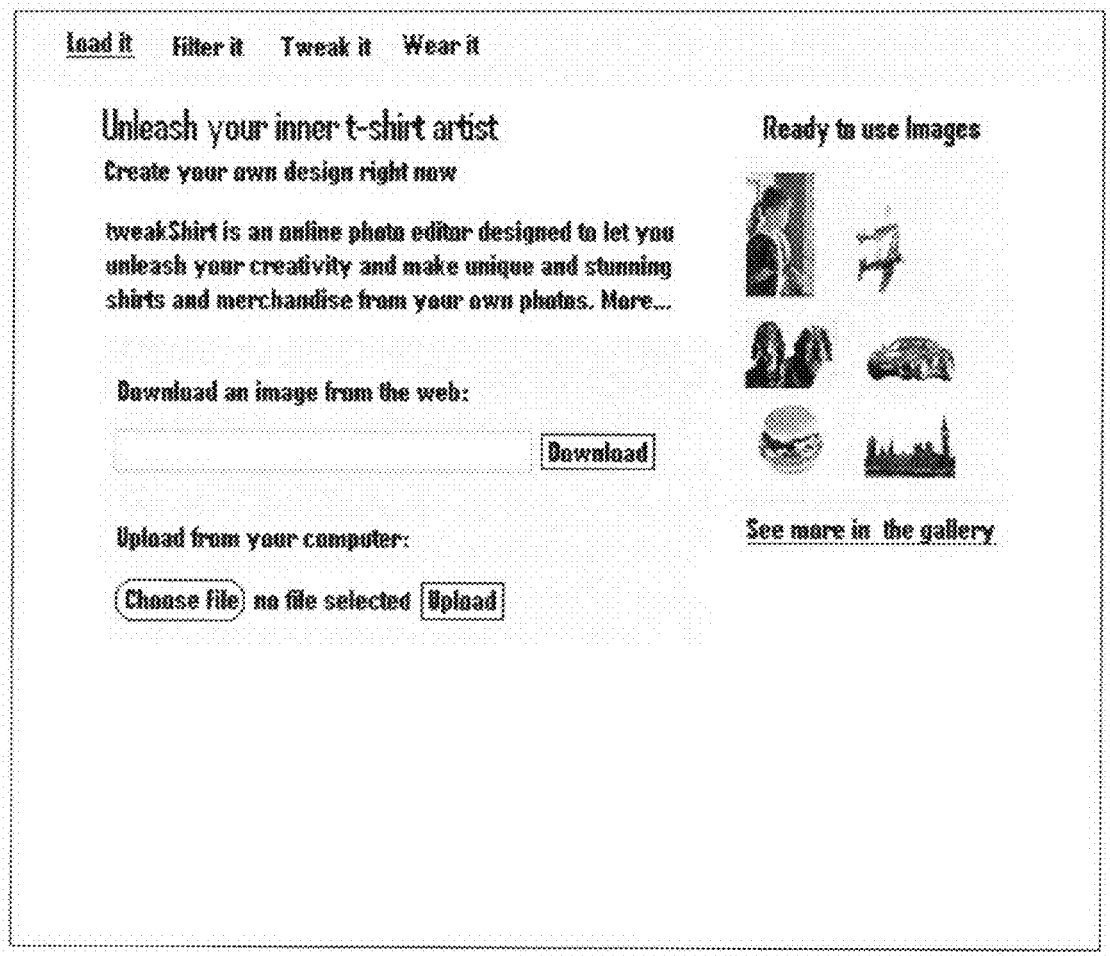
FIG. 4A exemplarily illustrates a screen shot of a webpage for submitting an image by a user.
Figure 4B:
FIG. 4B exemplarily illustrates a screen shot displaying multiple filters used for customizing the image by a user.
Figure 4C:
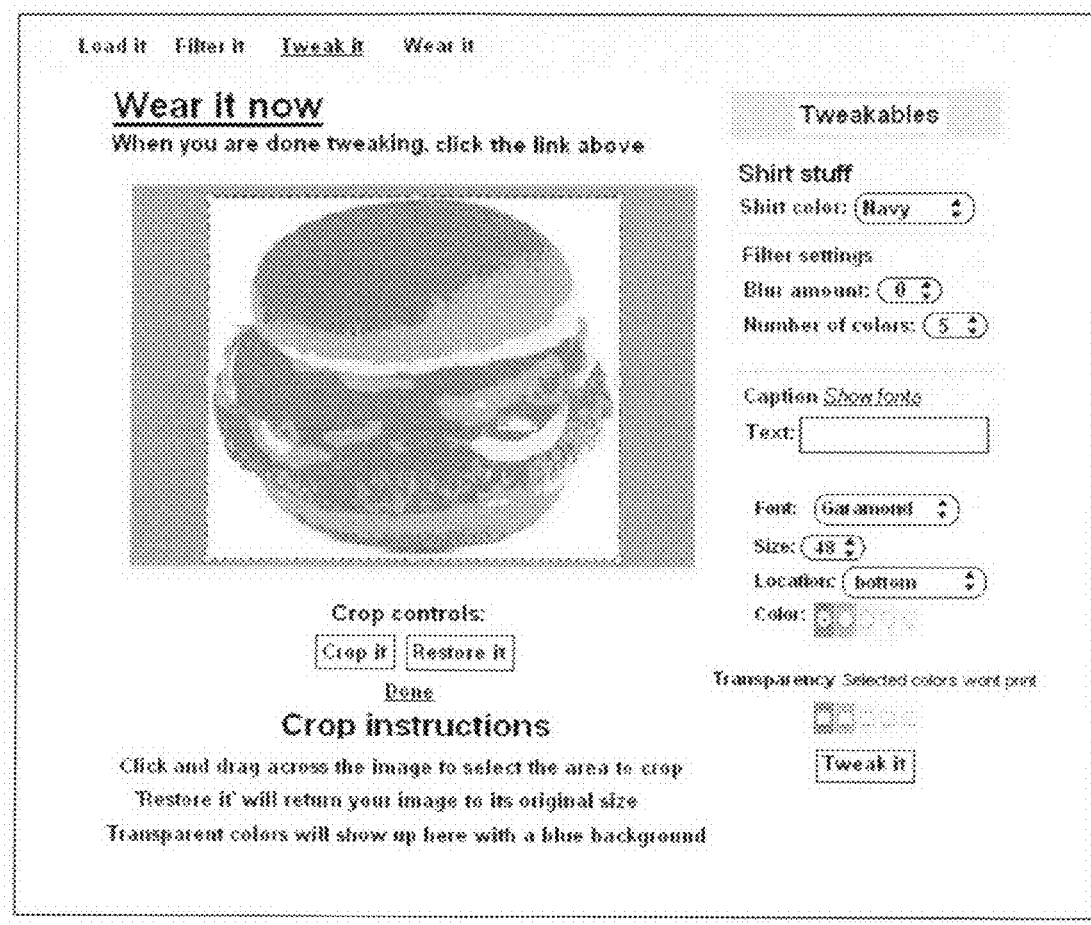
FIG. 4C exemplarily illustrates a screen shot of a webpage for cropping an image by a user.

Consider an example where a user 201, for example Jason wishes to create a customized image and wishes to print the customized image of a hamburger on a T-Shirt selected by Jason. Jason accesses the host website using a web browser on his personal computer (PC). Jason submits an image of the hamburger on a web page of the host website by downloading the image from the web or uploading the image stored on his PC as illustrated in FIG. 4A. The host website applies image filters to the image and displays the filtered images along with the submitted image as illustrated in FIG. 4B. Jason may select a filtered image from the displayed filtered images. The host website then displays the selected image as illustrated in FIG. 4C.

Figure 4D:
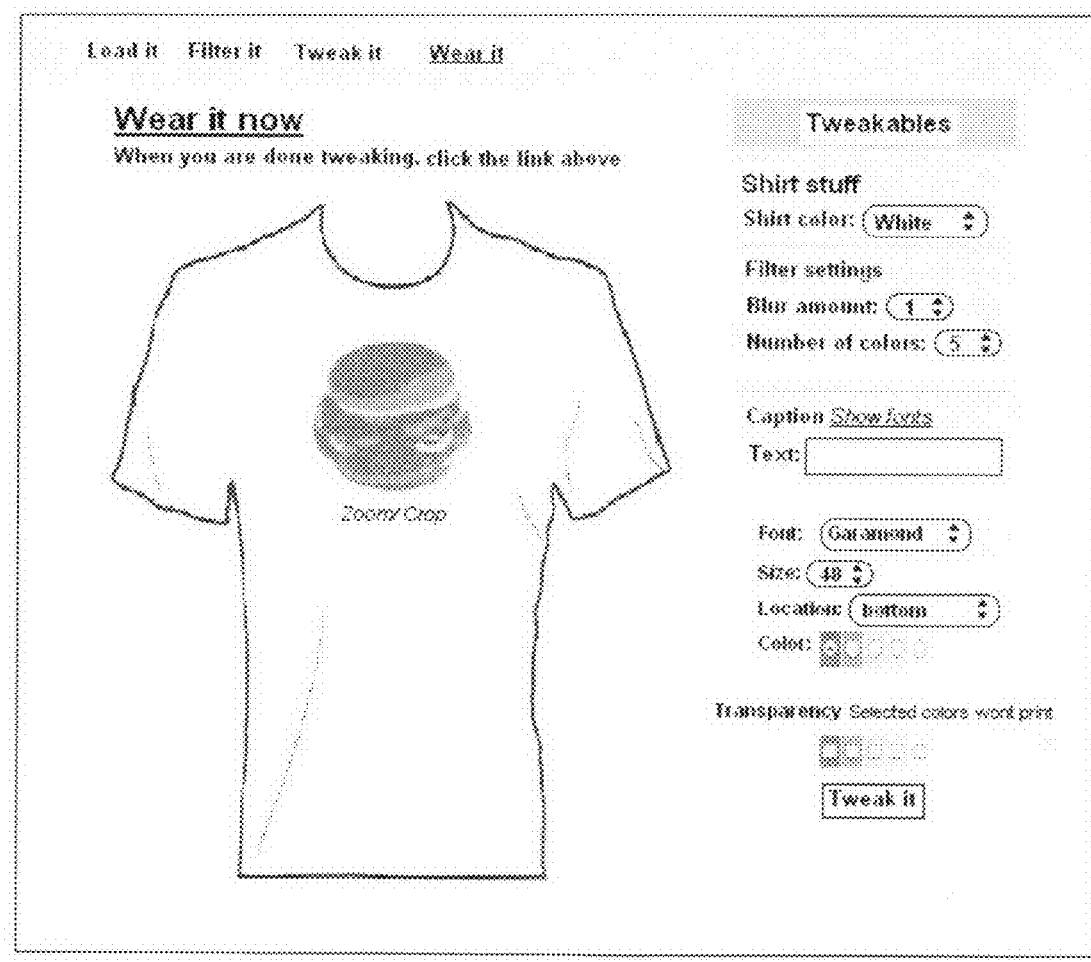
FIGS. 4D-4F exemplarily illustrate the steps involved in editing image attributes and text attributes by adjusting filter settings.
Figure 4E:
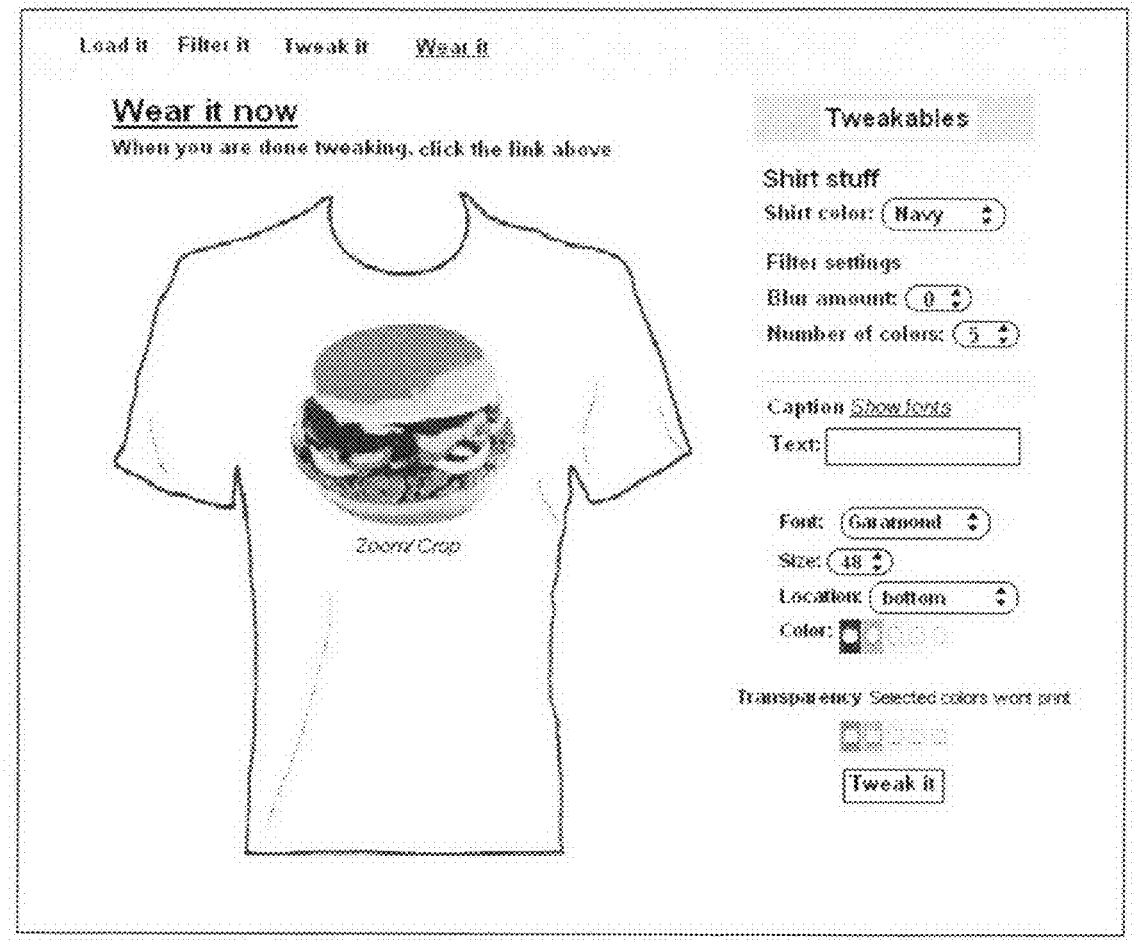
Figure 4F:
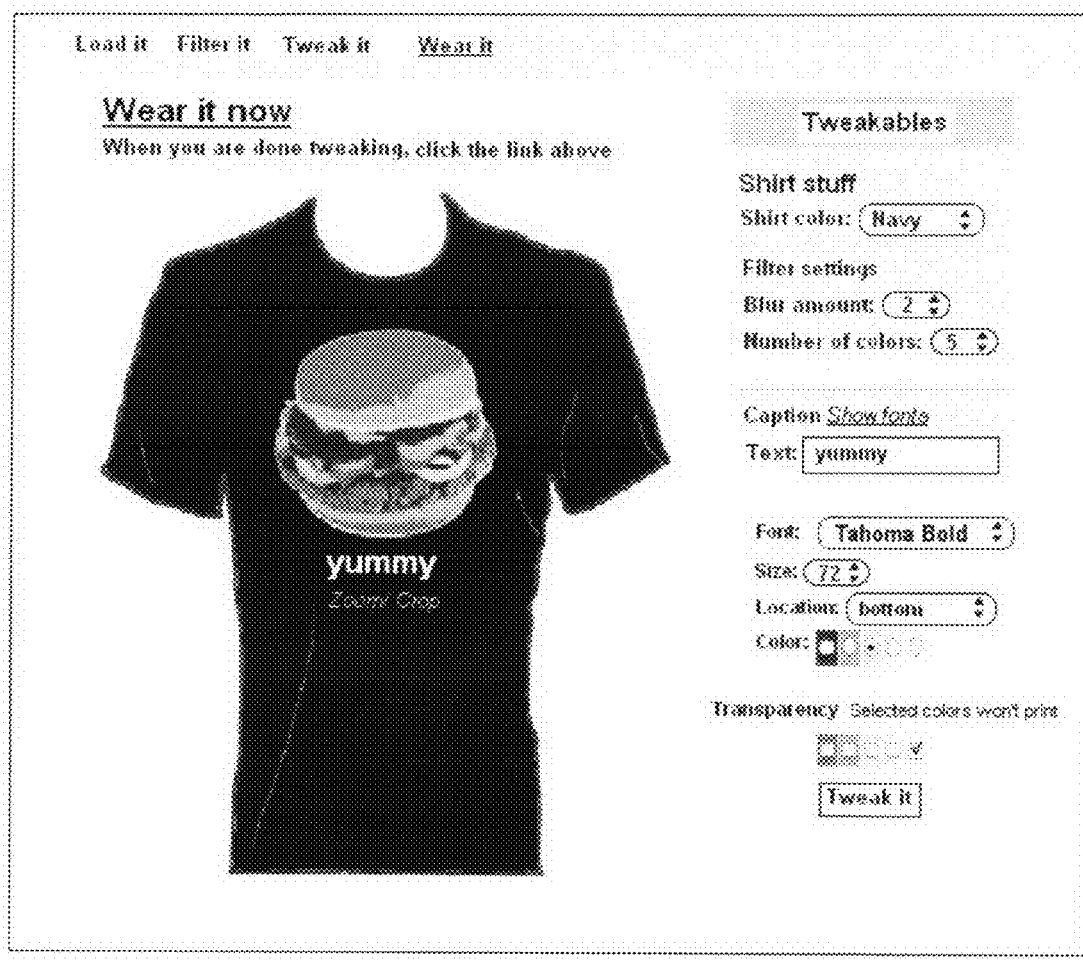
Figure 4G:
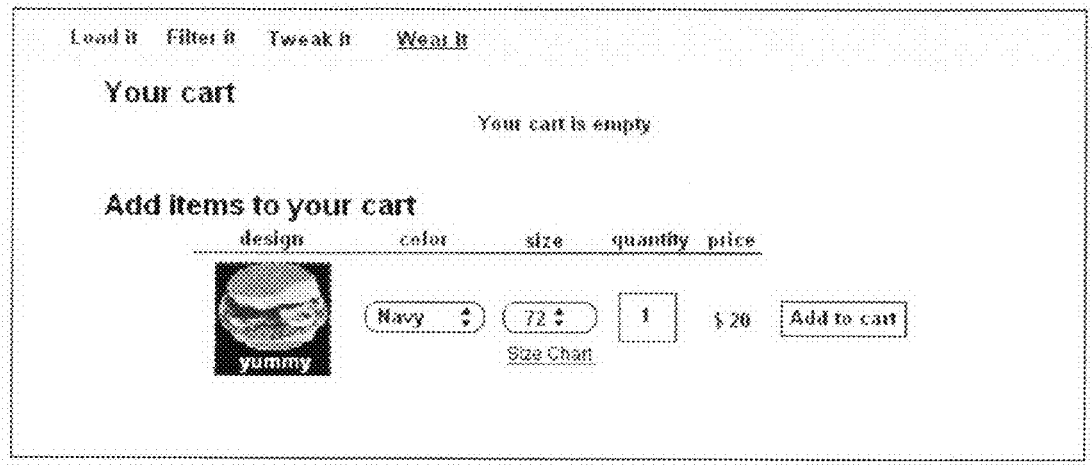
FIGS. 4G-4H exemplarily illustrate a screen shot of a webpage for adding customized images to a shopping cart.
Figure 4H:
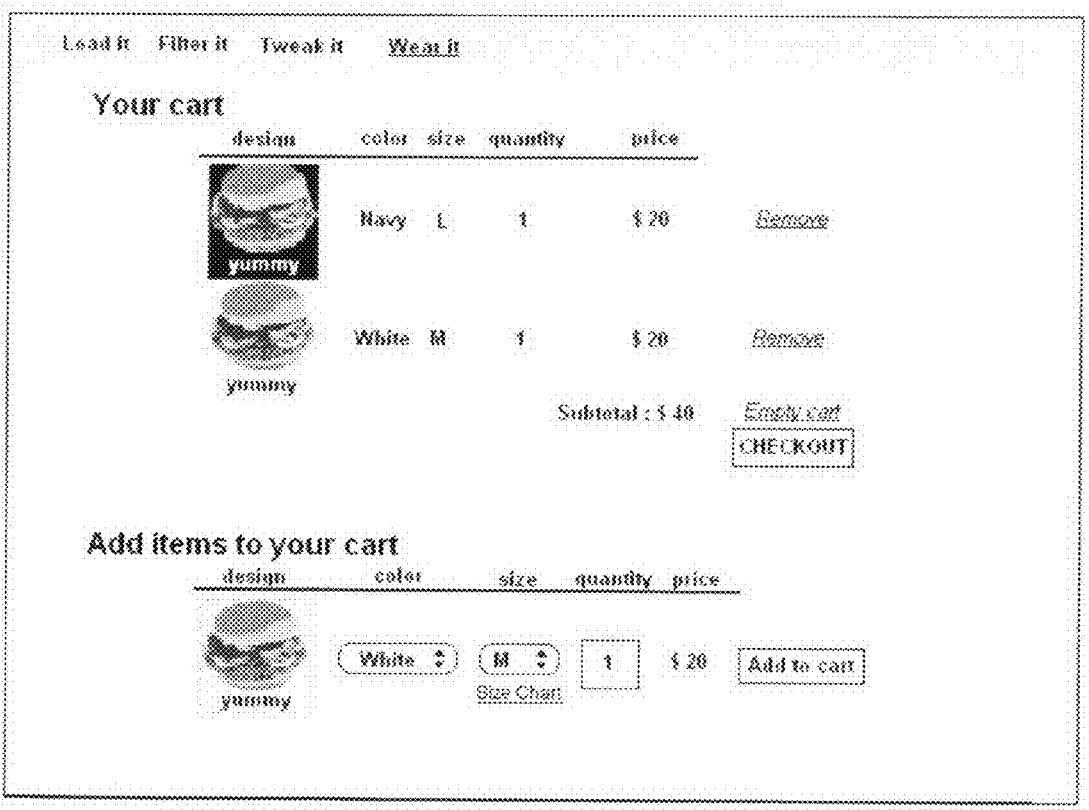

Jason may crop the image and adjust settings of the selected image filter in order to customize the image. The host website displays the cropped image on an image of a T-shirt as illustrated in FIG. 4D. Jason may also alter the blur amount and the number of colors used in the image as illustrated in FIG. 4D. Jason may then choose a color for the T-shirt as illustrated in FIG. 4E. Jason may also choose to remove a background color from the image. Jason may select colors from a palette comprising colors of the image and make the selected colors transparent on the T-shirt. Jason may further add a text caption for the T-shirt as illustrated in FIG. 4F. Jason may also select font style, text size, color of the text and the location of the caption on the T-shirt. Jason then adds the customized image to a shopping cart as illustrated in FIGS. 4G-4H. Jason then places an order for the item printed with the customized image and performs an online monetary transaction for purchasing the item.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of customizing an image to be printed on a printable surface of an item selected by a user, comprising the steps of:
    submitting said image on a host website by said user;
    selecting at least one of a plurality of image filters for the image by the user, wherein said image filters are provided on said host website;
    adjusting settings of said selected image filters by the user, wherein the selected image filters are applied on the image;
    said customizing of the image using one or more of said adjusted settings of the selected image filters;
    regenerating said customized image for each of the adjusted settings of the selected image filters;
    customizing external attributes of said item selected by the user; and
    printing the customized image on said printable surface of the item;
    whereby the image submitted by the user is customized and printed on the printable surface of the item selected by the user.

2. The computer implemented method of claim 1, wherein the item includes a merchandise item.

3. The computer implemented method of claim 1, wherein the image is obtained from a plurality of sources, wherein said sources comprise a computing device of the user, the host website, and external websites.

4. The computer implemented method of claim 1, wherein said step of adjusting the image comprises setting transparency of one or more colors of the image, wherein said colors are selected from a palette comprising the colors of the image.

5. The computer implemented method of claim 1, wherein said step of customizing the image comprises providing a text message with the customized image.

6. The computer implemented method of claim 5, further comprising a step of editing one or more of text attributes of said text message wherein said text attributes comprise text size, text font, text color, and location of text on the printable surface.

7. The computer implemented method of claim 1, wherein said step of customizing the image comprises editing one or more of image attributes wherein said image attributes comprise blur amount of the image, image resolution, print resolution, size of the image, location of the image on the printable surface, and number of colors in the image.

8. The computer implemented method of claim 1, wherein said external attributes include size, shape, texture, material, color, and quantity of the item.

9. The computer implemented method of claim 1, further comprising a step of purchasing the item with the customized image by the user through an online monetary transaction.

10. A computer implemented system for customizing an image to be printed on a printable surface of an item selected by a user, comprising:
    an image server comprising:
        an image submission module for submitting said image on a host website by said user;
        an image filter module for enabling selection of at least one of a plurality of image filters for the image by the user, wherein said image filter module further enables adjustment of settings of said selected image filters by the user;
        an image customization module for customizing the image using said adjusted settings of the selected image filters, wherein said image customization module further enables customization of external attributes of said item selected by the user;
        an image regeneration module for regenerating said customized image for each of the adjusted settings of the selected image filters; and
    a printing facility for printing the customized image on said printable surface of the item selected by the user.

11. The computer implemented system of claim 10, wherein the image filter module is used by the user to set transparency of one or more colors of the image to be printed on the printable surface, wherein said colors are selected from a palette comprising the colors of the image.

12. The computer implemented system of claim 10, further comprising a billing engine for managing and controlling an online monetary transaction performed by the user during purchase of the item with the customized image.

13. A computer program product comprising computer executable instructions embodied in a computer-readable medium, wherein said computer program product comprises:
    a first computer parsable program code for enabling submission of an image on a host website by a user;
    a second computer parsable program code for enabling selection of at least one of a plurality of image filters by said user, wherein said image filters are provided on said host website;
    a third computer parsable program code for enabling adjustment of settings of said selected image filters by the user;
    a fourth computer parsable program code for customizing said image using said adjusted settings of the selected image filters;
    a fifth computer parsable program code for regenerating said customized image for each of the adjusted settings of the selected image filters;
    a sixth computer parsable program code for customizing external attributes of an item selected by the user; and
    a seventh computer parsable program code for printing the customized image on a printable surface of said item.

* * * * *